United States Patent [19]
Koerner

[11] 3,714,626
[45] Jan. 30, 1973

[54] VEHICLE DETECTION SYSTEM

[75] Inventor: Ralph J. Koerner, Canoga Park, Calif.

[73] Assignee: Canoga Controls Corporation, Canoga Park, Calif.

[22] Filed: March 18, 1971

[21] Appl. No.: 125,724

[52] U.S. Cl. ............................................. 340/38 L
[51] Int. Cl. ............................................. G08g 1/00
[58] Field of Search ...................... 340/38 L, 310

[56] References Cited

UNITED STATES PATENTS

| | | | |
|---|---|---|---|
| 1,992,214 | 2/1935 | Katz | 340/38 L |
| 3,249,915 | 5/1966 | Koerner | 340/38 L |

*Primary Examiner*—Ralph D. Blakeslee
*Attorney*—Lindenberg, Freilich & Wasserman

[57] ABSTRACT

A system useful for indicating the entry of a vehicle onto a specified area of the earth's surface. The system includes a magnetic field sensor which yields an output signal indicative of the magnetic field intensity thereat. The sensor is mounted adjacent to but outside of a volume being monitored which constitutes the projection of the specified area in the direction of the magnetic field thereat. When the magnetically permeable mass of a vehicle enters the volume being monitored, it increases magnetic field intensity therein but reduces the field intensity outside of this volume. The reduction in field intensity is recognized by the sensor which then energizes an indicating device, which in the case of a service station installation, for example, can be a remote bell. The sensor preferably comprises a flux gate magnetometer.

18 Claims, 25 Drawing Figures

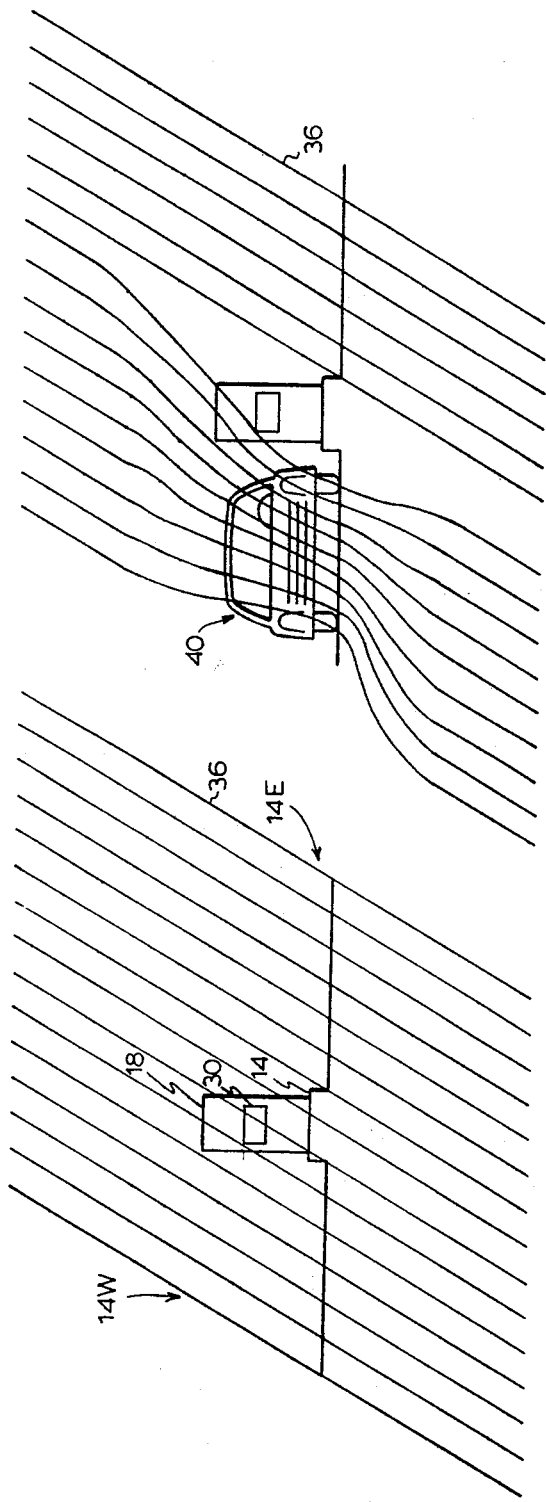
FIG. 2(a)
FIG. 3(a)
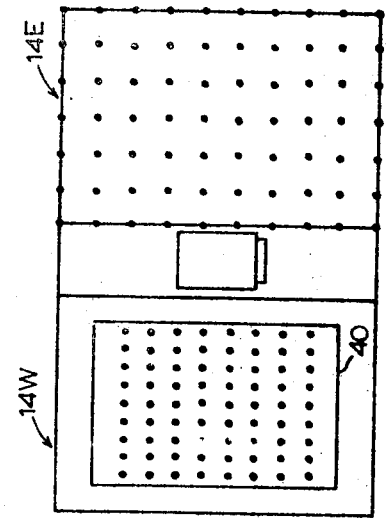
FIG. 3(b)
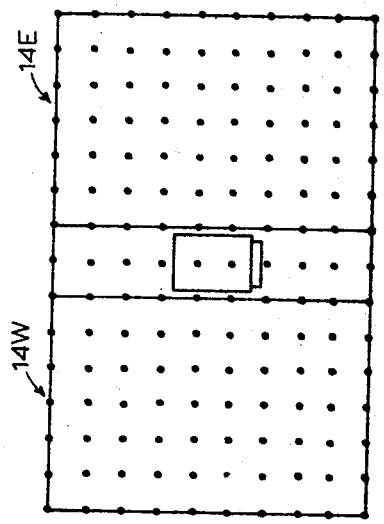
FIG. 2(b)

INVENTOR.
RALPH J. KOERNER

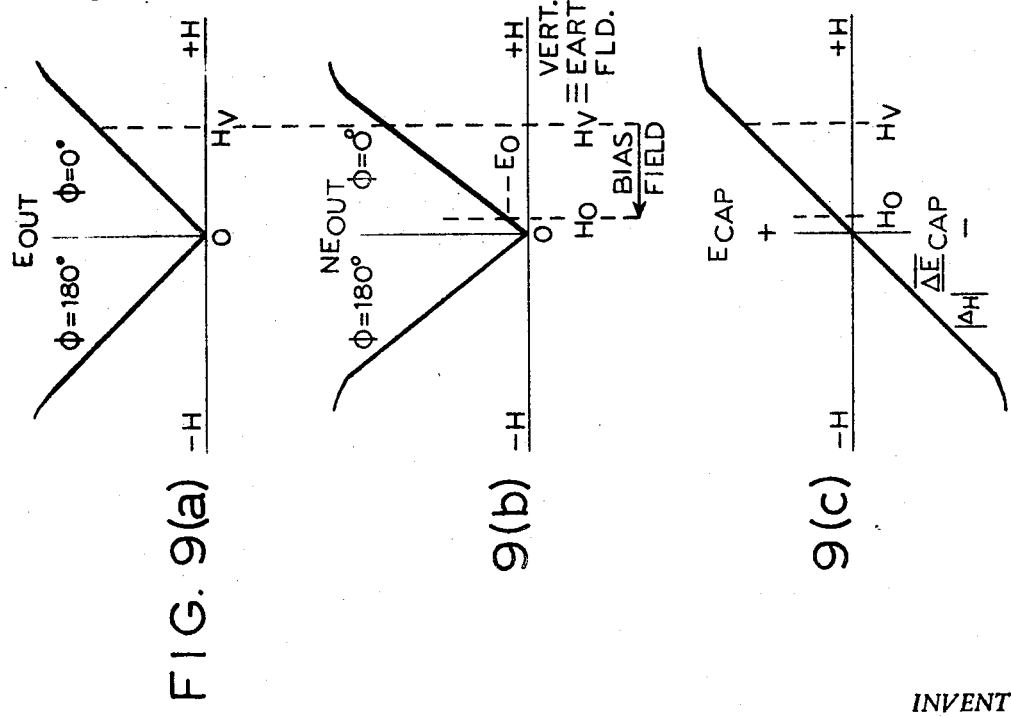

INVENTOR.
RALPH J. KOERNER ized is disclosed in U. S. Pat. No. 3,249,915 is-
VEHICLE DETECTION SYSTEM

RELATED APPLICATIONS

This application is a continuation-in-part of U. S. Pat. application Ser. No. 22,555 filed Mar. 25, 1970.

BACKGROUND OF THE INVENTION

This invention relates generally to systems for detecting vehicles and is particularly useful in traffic applications as well as service stations and the like for indicating the entry of a vehicle into a specified area.

Most modern service stations are equipped with some type of system for detecting the entry of a vehicle into a specified service area, usually adjacent the gasoline dispensers, and for remotely indicating the vehicle's arrival, as by ringing a bell within the service station house. The most prevalent system by far for performing this task utilizes an inexpensive pneumatic hose which is layed on the ground in the specified area and which is directly coupled to a bell unit within the house. The tires of an arriving vehicle travel over and pinch the hose to couple a pneumatic pulse to the bell unit to close a pair of contacts to in turn energize a striker solenoid. Although such pneumatic systems are relatively inexpensive to install, their disadvantages have long been recognized. For example only, they present a very real pedestrian hazard, must be periodically replaced, and often malfunction as a consequence of filling with water. In view of these and other disadvantages, many underground systems have been proposed and utilized. One such early system utilized a photodetector buried under the service area which looked upwardly through a transparent window. When a vehicle arrived, it rapidly reduced the light to the detector to trigger actuation of the bell. As might be expected, however, such a system provided to be unreliable due primarily to dirt collecting on the window, pedestrians walking over it, etc.

Other underground detection systems have operated in response to the magnetic characteristics of a vehicle. More particularly, in one such system, a large multi-turn wire coil is buried beneath the surface around the entire area to be monitored and is connected to the bell unit within the service station house. As a vehicle enters the area, it varies the intensity of the earth's magnetic field and as a consequence induces an electromotive force (EMF) in the wire related to the rate of change of flux, which EMF actuates the striker solenoid.

Still other systems have employed magnetometer probes buried under the surface within the service area to be monitored and connected to the bell unit within the service station house. The magnetometer probes provide an output signal related to magnetic field intensity through an effective sampling area thereof. As a consequence, each magnetometer probe is able to detect a vehicle passing thereover by sensing the increase in magnetic field intensity produced by the vehicle. A field intensity increase produces a variation in the magnetometer output signal to in turn actuate the striker solenoid. A magnetometer system which can be used in this manner is disclosed in U. S. Pat. No. 3,249,915 issued to Ralph J. Koerner.

Although the buried coil and magnetometer systems generally function satisfactorily to detect and indicate the arrival of a vehicle, they are generally quite expensive to install because they require that the concrete service areas or surrounding blacktop areas or both be extensively saw cut. In the case of the coil, a single coil is usually buried around an entire service area concrete pad which may encompass two service islands and be on the order of 30 × 60 feet, thus requiring a saw cut of over 180 linear feet. In the case of the conventional magnetometer probe system, one or more probes is buried in the service area pad on each side of a service island. A somewhat shorter total saw cut length is normally required for the buried magnetometer system as compared to the buried coil system, but the greater cost of the magnetometer probes as compared to the wire, often causes the total cost of an installed buried magnetometer system to exceed that of a buried coil system.

SUMMARY OF THE INVENTION

An object of the present invention is to provide an improved system for detecting the entry of a vehicle into a specified area of the earth's surface.

The operation of known prior art magnetometer vehicle detector systems has been based upon the recognition that the magnetically permeable (permeability greater than unity) masses found in conventional vehicles, effectively collect and concentrate the earth's magnetic field lines (essentially vertical at the earth's surface at locations remote from the equator) therethrough to thus increase the magnetic field intensity above and below the vehicle as compared to the ambient magnetic field intensity in the absence of the vehicle. Thus, prior art systems, of which the system of U. S. Pat. No. 3,249,915 is exemplary, have utilized magnetometers displaced vertically, either above or below, from the specified area of the earth's surface being monitored but within a volume constituting a substantially vertical projection of the specified area. As is explained in the afore-mentioned U. S. patent, although the earth's magnetic field can usually be considered as being essentially vertical at most significant locations on the earth's surface, it is seldom truly vertical, but rather exhibits a slight inclination or dip angle. Accordingly, use of the term "substantially vertical projection" herein should be understood to mean the projection of a specified area at essentially the inclination or dip angle of the magnetic field appropriate to the location of that area.

In accordance with one aspect of the present invention, magnetic field sensing devices such as flux gate magnetometers, are disposed adjacent to but outside of the volume formed by projecting the area to be monitored in the direction of the magnetic field to detect a reduction in magnetic field intensity caused by the entry of a vehicle into the monitored area. More particularly, instead of using a magnetometer to look for an increase in magnetic field intensity produced by a vehicle entering into a specified volume, in accordance with the present invention a magnetometer is used to look for a reduction in magnetic field intensity adjacent to but outside of that volume.

The significant advantages in detecting vehicles by sensing a reduced, rather than an increased, magnetic field intensity, is that a single magnetometer probe can be used to monitor two adjacent areas such as areas on both sides of a service station island or two adjacent lanes on a multiple lane roadway. Additionally, in accordance with the present invention, the magnetometer can be conveniently mounted above the surface at a height which would interfere with the vehicle if the magnetometer was mounted within the projection of the monitored area. By enabling the magnetometer probe to be mounted above the surface, for example on the gasoline dispenser housing in a service station, installation costs as compared with buried systems are reduced drastically.

In a preferred embodiment of the invention, for use in applications in service stations, for example, where it is desired to actuate an indicator such as a bell at a location remote from the sensor unit, a command or bell actuation signal is communicated to the bell unit over the existing service station 110 volt 60 hertz ac power line which is normally available at both the service station house and islands.

More particularly, in a preferred embodiment of the invention, flux gate magnetometers are utilized as the magnetic field sensors. The magnetometers are excited by an oscillator within the sensor unit at some frequency which is very high compared to 60 hertz; e.g., 100 K hertz. In response to the sensor unit detecting the entry of a vehicle into the monitored area, the oscillator output is gated onto the existing power line for a short interval. A bandpass filter at the bell unit responds to the oscillator output to actuate the striker solenoid.

In accordance with the present invention, a reduction in field intensity is sensed by comparing the megnetometer output signal with a reference signal corresponding to a threshold level of field intensity. In one embodiment of the invention, the threshold level is set based upon ambient conditions and then held constant. This embodiment enables the detection system to sense the continued presence of a vehicle within the monitored area, as well as the entry of the vehicle into the area. That is, as long as the vehicle is present within the monitored area, the field intensity measured by the magnetometer will be below ambient.

In accordance with another embodiment of the invention, the threshold level is caused to vary in response to the magnetometer output signal to thus enable the sensor unit to adapt to what can be considered a changed ambient level. In this adaptive embodiment, the entry of a vehicle to one side of a service station island will reduce the field intensity seen by the magnetometer on the island and will cause the threshold level to drift toward the reduced intensity level seen by the magnetometer. After a short time interval, e.g., 3 seconds, the threshold level will reach the reduced intensity level and the sensor unit will then be in condition to sense a further field reduction as would be produced by a vehicle entering the service area to the other side of the island.

Although embodiments of the present invention find particular utility in service station applications and the like, it is emphasized that the concept of sensing for a reduced magnetic field intensity outside of the substantially vertical projection of a monitored area finds significant utility in many other vehicle detection systems such as in conjunction with parking gates, toll collection systems, traffic actuation and counting systems, etc.

In a preferred embodiment of the invention for use in applications requiring the disposition of a multiple number of magnetometer probes at locations where power is not normally available, a multiconductor cable is employed to connect the probes to a common control circuit including both excitation and detection circuitry. The magnetometer primary windings are all preferably connected in series and coupled to the excitation circuitry by two of the cable conductors. The magnetometer secondary windings are also preferably connected in series and coupled to the detection circuitry by two other cable conductors. In accordance with a feature of this embodiment, means are provided for biasing the magnetometers to a desired operating point in a manner which assures substantially constant sensitivity per probe regardless of the number of probes employed, up to a certain maximum number of course dependent upon device parameters.

A preferred probe structure is also disclosed herein particularly suited for burial between lanes of a roadway. The probe structure includes a flux gate magnetometer sealed in a housing dimensioned to fit within a slot typically saw cut in roadway surfaces to receive cable.

The novel features of the invention are set forth with particularlity in the appended claims. The invention will be best understood from the following description when read in conjunction with the accompanying drawings.

BRIEF DESCRIPTION OF THE DRAWINGS

FIGS. 2(a) and 2(b) are diagrams schematically illustrating the substantially uniform ambient earth's magnetic field produced adjacent a service station island in the absence of a vehicle adjacent thereto;

FIGS. 3(a) and 3(b) are schematic diagrams illustrating the manner in which a vehicle entering the area adjacent the island shown in FIGS. 2(a) and 2(b) distorts the ambient magnetic field;

FIG. 9 (a) thru (c) is a diagram illustrating the operational characteristic of a flux gate magnetometer;

FIG. 10 (a) thru (f) is a waveform diagram illustrating the waveforms occurring at various points in the circuit of FIG. 8;

DESCRIPTION OF THE PREFERRED EMBODIMENTS

Figure 1:
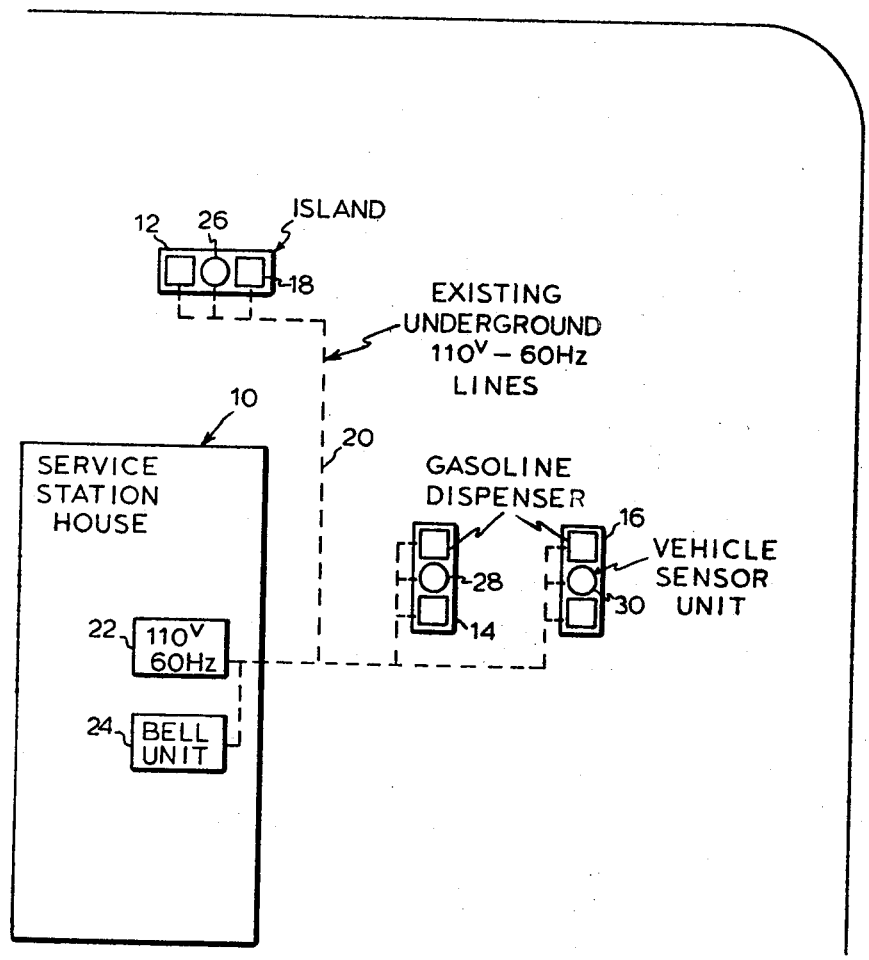
FIG. 1 is a schematic plan view of a typical service station.

Attention is now called to FIG. 1 of the drawings which illustrates a schematic plan view of a typical service station. The station of FIG. 1 includes a service station house 10 and three service islands 12, 14 and 16. Typically, each of the islands will have two or more gasoline dispensers 18. An underground 110 volt, 60 hertz alternating current power line 20 typically connects the electrical panel 22 at the house 10 to each of the service islands.

A bell unit 24 is normally mounted within the house 10 for audibly signaling when a vehicle enters a service area adjacent to one of the islands. As previously pointed out, typical prior art systems for detecting the entry of a vehicle have utilized pneumatic hoses laid on the ground, or photodetectors, wire coils, or magnetometer detectors, buried beneath the surface. Regardless of the particular type of detection system employed, some means is, of course, provided for actuating the bell unit 24 in response to the detection of a vehicle entry.

In accordance with the present invention, a vehicle sensor unit, to be described hereinafter in detail, is mounted on each of the islands for detecting the entry of a vehicle into the service area on either side of the island. More particularly, a vehicle sensor unit 26 is mounted on the island 12 for detecting the entry of a vehicle into the service areas immediately north and south of the island 12. Similarly, a sensor unit 28 is mounted on the island 14 for detecting the entry of vehicles into the service areas immediately east and west of the island 14. Sensor unit 30 is mounted on the island 16 to detect the entry of a vehicle into the service areas immediately east and west of the island 16.

As will be better appreciated hereinafter, the sensor units are comprised of magnetic field sensing device and associated electronic circuitry and can be housed within a very small container adapted to be mounted on any convenient structure such as, for example, the gasoline dispenser housings. FIG. 1 is intended to merely illustrate the vehicle sensor units as being located on the islands and being connected to the existing service station 110 volt, 60 hertz power line. As will be seen hereinafter, in accordance with the preferred embodiment of the present invention, each of the vehicle sensor units is electrically powered from the 110 volt, 60 hertz power line. In addition, each sensor unit, in response to detecting the entry of a vehicle into an adjacent service area, provides a high frequency command or bell actuation signal on the power line 20. This high frequency command signal is detected by the remote bell unit 24 in house 10 to actuate a striker solenoid therein. By utilizing the existing power lines 20 to communicate between the islands and the bell unit 24, installation costs as compared to existing detection systems are drastically reduced.

Attention is now called to FIGS. 2(a) and 2(b) which illustrate a representation of the ambient earth's magnetic field adjacent to one of the islands, e.g., island 14, of FIG. 1. FIG. 2 illustrates a single gasoline dispenser 18 situated on the island 14. The vehicle sensor unit 30 is illustrated as being mounted on the side of the gasoline dispenser housing.

FIGS. 2(a) and 2(b) illustrate lines 37 intended to represent the ambient earth's magnetic field in the absence of a vehicle or other magnetically permeable mass being present in the service areas 14W and 14E to the west and east, respectively of the island 14. As represented in FIGS. 2(a) and 2(b), it will be noted that the ambient earth's magnetic field intensity is substantially uniform in the absence of a vehicle within the service area. It will be appreciated, of course, that steady state magnetic field distortions due to the permanent presence of magnetically permeable masses, such as the housing of the dispenser 18, have been ignored. The magnetic field lines 36 in FIGS. 2(a) and 2(b) have been illustrated as being slightly inclined with respect to the surface. Although the magnetic field can be considered as being substantially vertical with respect to the surface at most locations on the earth's surface displaced from the equator, in reality, the magnetic field lines at any particular location will be inclined at some angle usually referred to as the dip angle of the earth's magnetic field. For example, the dip angle in Los Angeles, Calif. is approximately 60°.

The sensor unit 30, as will be explained, in greater detail hereinafter, includes a magnetic field sensing device which provides an output signal having a characteristic related to the level of magnetic field intensity through a "sampling area" or "flux collecting aperture" thereof. As is explained in the afore-cited U. S. Pat. No. 3,249,915, magnetic field sensing devices generally may be regarded as having such a sampling area or flux collecting aperture, the size and shape of which are dependent upon the characteristics of the particular device. In the preferred embodiment of the present invention, the sensing device comprises a flux gate magnetometer whose sampling area is generally defined by the nature, size and shape of the magnetometer core structure an any additional flux collecting elements, if any, together with the coils surrounding the core structure.

As shown in FIGS. 2 and 3, the sensing unit 30 is mounted between the projections of the service areas 14W and 14E projected in the direction of the magnetic field. The sensing device, i.e., the magnetometer, within the sensing unit is oriented so that its sampling area senses the substantially vertical external magnetic field component so as to thus enable it to indicate a reduction in that component from an ambient level caused by a vehicle entering one of the areas 14W or 14E.

More particularly, as has been recognized and explained in the afore-cited U. S. Pat. No. 3,249,915, a magnetically permeable mass, such as is found in conventional vehicles, will concentrate the magnetic field lines therethrough to thus increase magnetic field intensity above and below the vehicle. More accurately, it can be said that the presence of a magnetically permeable mass on a specified area of the earth's surface, such as service area 14W of FIGS. 2 and 3, will increase the magnetic field intensity within a volume constituting the projection of the specified area in a direction determined by the magnetic field inclination at that site. Whereas, prior art magnetometer detection systems have employed the recognition of this intensity increase phenomena in order to detect the presence of vehicles within a specified area, in accordance with the present invention the magnetic field sensing means is disposed so as to sense magnetic field intensity outside of the volume in which the field intensity is increased as a consequence of the vehicle presence. That is, as shown in FIGS. 2 and 3, the sensor unit 30 is mounted so as to be adjacent to but outside of the volumes constituting the substantially vertical projections of the specified service areas 14W and 14E. Consequently, when the vehicle 40 enters the area 14W, it substantially increases the field intensity as represented in FIGS. 3(a) and 3(b) above and below the vehicle within the projection of the area 14W in the direction of the magnetic field. However, as will also be noted in FIGS. 3(a) and 3(b) in the presence of the vehicle 40, the field intensity is reduced from ambient adjacent to but outside of the projection of the area being monitored. Thus, the magnetic field intensity at the sensor unit 30 in the presence of the vehicle 40 as shown in FIG. 3 is reduced from the ambient field intensity level as shown in FIG. 2 and it is this field intensity reduction which is sensed to actuate the remote bell unit 24 in house 10.

Figure 4A:
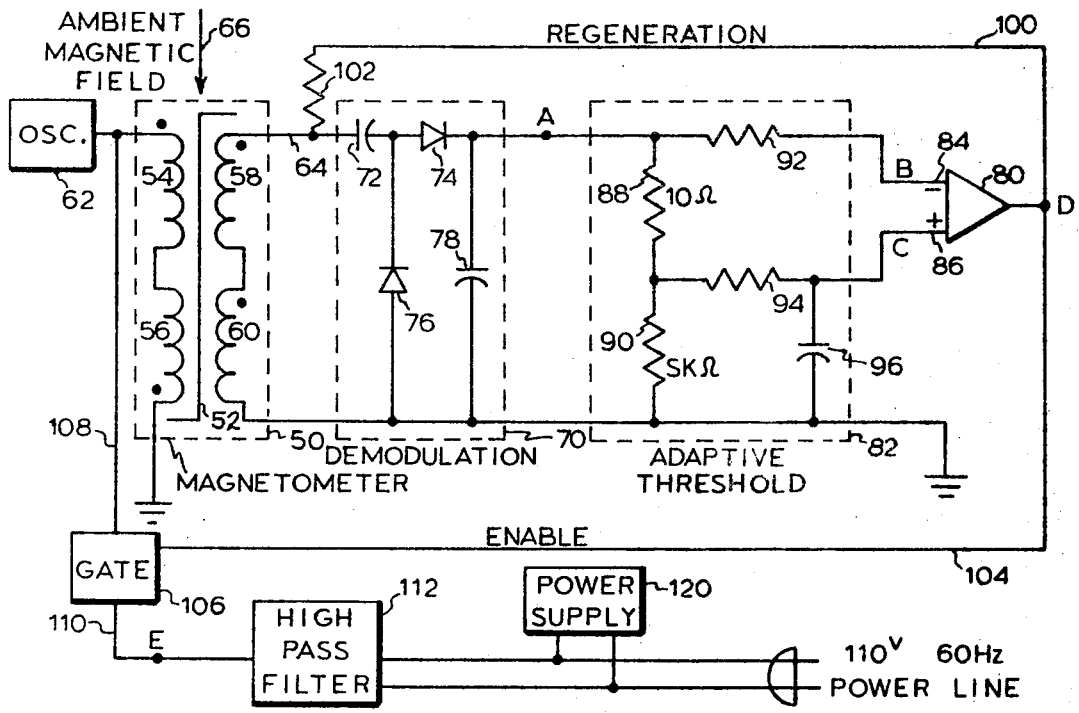
FIG. 4(a) is a schematic diagram of a preferred sensor unit embodiment in accordance with the present invention for sensing the entry of a vehicle into a specified area.

Attention is now called to FIG. 4(a) which illustrates a schematic diagram of a preferred embodiment of a vehicle sensor unit, e.g., 30, in accordance with the present invention. The embodiment of FIG. 4(a) preferably employs a flux gate magnetometer 50 as the magnetic field sensing device mounted so as to sense the substantially vertical magnetic field component. As is explained in detail in the afore-cited U. S. Pat. No. 3,249,915, a flux gate magnetometer 50 can be comprised of a magnetically saturable element 52 forming a core upon which a plurality of windings 54, 56, 58 and 60 are placed. The windings 54 and 56 comprise energizing windings and are wound on the core 52 with opposite orientations, as expressed by the orientation representing dots. As shown, the windings 54, and 56 are connected in series between the output terminal of an oscillator 62 and a source of reference potential, such as ground. The oscillator 62 provides a relatively high frequency alternating current output signal, e.g., at 100 kilohertz, to energize the windings 54 and 56.

The windings 58 and 60 comprise output windings and, as represented by the orientation dots, are wound on the core 50 with similar orientations. The windings 58 and 60 are connected in series between a source of reference potential, as found, and a magnetometer output terminal 64.

As is explained in the cited U. S. Pat. No. 3,249,915, the flux gate magnetometer 50 will provide an output signal at terminal 64 having a frequency equal to twice that of the output of oscillator 62 and an amplitude substantially proportional to the net magnetic field intensity component, e.g., represented by arrow 66, through the sampling area thereof, essentially along core 52. The operation of the magnetometer 50 can be readily understood by initially considering its performance in the absence of any net external magnetic field component along the core 52. In this situation, during each half cycle of the energizing signal provided by oscillator 62, the windings 54 and 56 will produce opposite magnetic fields in the upper and lower (as represented in FIG. 4(a)) portions of core 52, respectively. The parameters of the magnetometer are selected such that saturation occurs within the core 52 for a major portion of each half cycle. Since the windings 54 and 56 are producing oppositely directed magnetic fields within the core 52 and since the output windings 58 and 60 are similarly wound, equal amplitude output signals of opposite polarity will be induced in the windings 58 and 60 by transformer action prior to saturation during each half cycle. As long as the signals induced in windings 58 and 60 are equal and of opposite polarity, they will, of course, cancel one another to provide essentially a zero amplitude output signal at magnetometer output terminal 64.

Now consider the action of the magnetometer in the presence of an ambient magnetic field as represented by the arrow 66. In this situation, during each half cycle of the energizing signal, either the upper or lower section of the core 52 will saturate before the other section depending upon the direction of the ambient magnetic field. Thus, transformer action will continue for a longer portion of each half cycle in one of the output windings 58 or 60, as compared to the duration of transformer action in the other output winding. As a consequence, the output windings 58 and 60 will yield an output signal at terminal 64 which has a frequency twice that of the frequency of the signal provided by the oscillator 62 and an amplitude substantially proportional to the magnitude of the magnetic field intensity component 66 along the core 52.

It is emphasized that although the disclosed flux gate magnetometer 50 constitutes a preferred form of magnetic field intensity sensing means, it is recognized that sensing devices other than the disclosed flux gate magnetometer could be suitably employed in accordance with the present invention.

Figure 4B:
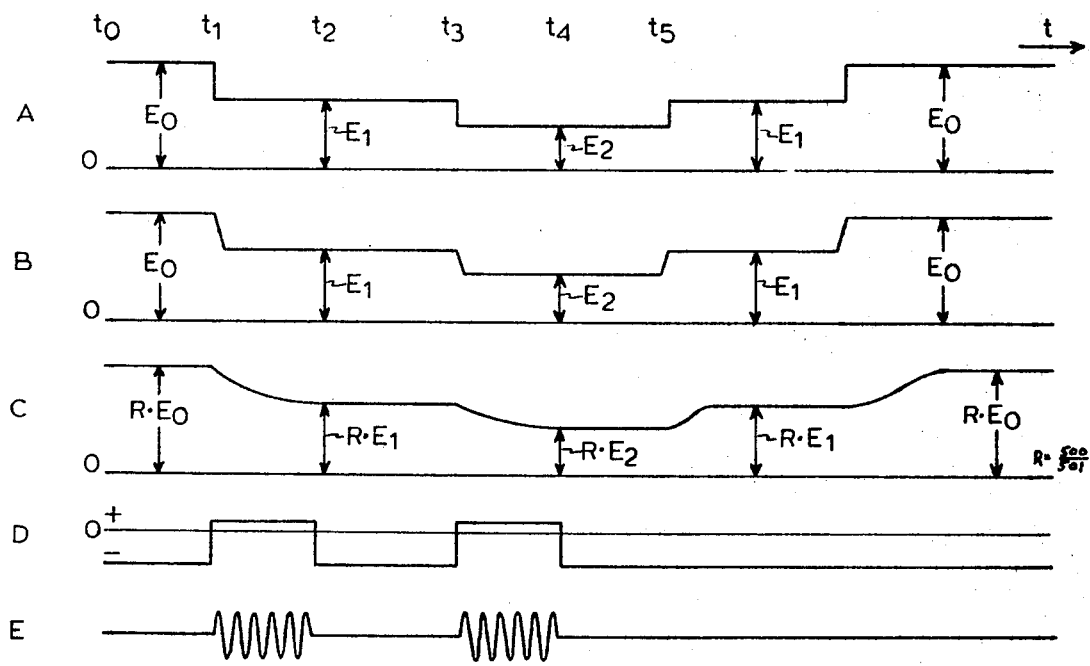
FIG. 4(b) is a diagram illustrating waveforms occurring at various points in the circuit of FIG. 4(a)

The output signal provided on terminal 64 by the flux gate magnetometer 50 is coupled to a circuit 70 which will be referred to as a demodulation circuit. The demodulation circuit 70 responds to the alternating magnetometer output signal to provide a direct current signal at circuit point A having an amplitude substantially proportional to the external magnetic field intensity 66. The circuit 70 is comprised of a capacitor 72 and a diode 74 serially connected between magnetometer output terminal 64 and circuit point A. Diode 76 connects the junction between capacitor 72 and diode 74 to ground. Storage capacitor 78 connects circuit point A to ground. The two diodes 74 and 76 operate in conjunction with the capacitor 72 to provide voltage doubling and rectification. The capacitor 78 acts as a storage or integrating capacitor to yield a direct current potential at circuit point A substantially proportional to the intensity of the external magnetic field 66. As shown in FIG. 4(b), it will be assumed that the direct current potential level established at circuit point A by the component of the ambient magnetic field along core 52 is equal to $E_0$.

As has been pointed out, in accordance with the present invention the magnetometer 50 is mounted so as to sense the substantially vertical field component adjacent to but outside of the projection of an area being monitored so that the entry of a magnetic permeable mass, i.e., a vehicle, into the monitored area, as was explained in conjunction with FIGS. 1, 2 and 3, will cause a reduction in the external magnetic field intensity through the magnetometer sampling area. As a consequence, the DC potential on circuit point A will fall from the level $E_0$ to a lower level, represented by $E_1$. That is, in the representative waveforms of FIG. 4(b), the absence of a vehicle within either of the monitored areas 14W or 14E of FIGS. 2 and 3 has been assumed between times t0 and t1, however, it is assumed that a vehicle 40 enters one of the monitored areas, e.g., area 14W to thus reduce the external field intensity along saturable core 52 and in turn reduce the potential at circuit point A of FIG. 4(a) from the level $E_0$ to the level $E_1$ (FIG. 4(b)).

The reduction in potential at circuit point A caused by a vehicle entering a monitored service area is coupled to an amplifier 80 to generate a command signal to ultimately energize an audible alarm. Although the eduction in potential at circuit point A could be merely AC coupled in a conventional manner to the amplifier 80 by a capacitor and resistor, it has been found to be generally preferable to employ an adaptive threshold circuit, such as circuit 82 of FIG. 4(a), to couple circuit point A to the amplifier 80. Briefly, the function of the adaptive threshold circuit 82 is to define a threshold signal level just slightly below, e.g., 0.2 percent, the level of the signal at circuit point A. When a magnetically permeable mass enters the area being monitored to reduce the level at circuit point A by more than 0.2 percent, this will trigger the amplifier 80 to generate a command output signal. After a short interval, e.g., 3 seconds, the threshold signal developed by the adaptive threshold circuit 82 will then adapt to the new level at circuit point A, so as to be able to thereafter recognize the entry of a subsequent magnetically permeable mass into the area being monitored.

More particularly, the adaptive threshold circuit 82 is comprised of a voltage divider including resistors 88 and 90 connected in series. In order to establish a threshold level substantially 0.2 percent below the level at circuit point A, the resistor 90 is selected to have a value approximately 500 times that of the resistor 88. Thus, resistor 88 can have an exemplary value of 10 K ohms and resistor 90 a value of 5 K ohms. A resistor 92, which may for example, be approximately 10 K ohms, couples circuit point A directly to amplifier input terminal 84. Resistor 94 which also may have a value on the order of 10 ohms, couples the junction between resistors 88 and 90 to amplifier input terminal 86. A relatively large capacitor 96, for example having a value of 250 microfarads, connects amplifier input terminal 86 to ground.

Prior to considering the operation of the adaptive threshold circuit 82, it is pointed out that the amplifier 80 preferably comprises an operational amplifier, of which several satisfactory types are readily commercially available. The amplifier 80 is used such that when the potential on terminal 84 is more positive than the potential on terminal 86, the amplifier 80 will provide a negative output signal. On the other hand, when the potential on amplifier input terminal 86 is more positive than the potential on input terminal 84, then the amplifier 80 will provide a positive output signal.

Referring now to FIG. 4(b), it will be noted that under ambient conditions in the absence of a vehicle within the monitored area, as represented between the times t0 and t1, the potential on amplifier input terminal 84, i.e., circuit point B, will be equal to $E_0$ or in other words the potential at circuit point A. At this time, the potential on amplifier input terminal 86 will be equal to $R \cdot E_0$ where R constitutes the ratio of the value of resistor 90 to the sum of the values of resistors 88 and 90. Thus, utilizing the exemplary values shown in FIG. 4(a), the potential at input terminal 86 (circuit point C) will be $(500/501) \times E_0$. Accordingly, since the potential at input terminal 84 is more positive than the potential at input terminal 86, the amplifier 80 will provide a negative output signal at circuit point D as represented in FIG 4(b).

Now assume at time $t_1$ a vehicle enters the monitored service area 14W of FIGS. 2 and 3. The magnetometer 50 will immediately sense the resulting reduced magnetic field intensity and thus the potential at circuit point A will immediately fall from level $E_0$ to $E_1$. Since circuit point B is directly resistively coupled to circuit point A, the potential thereon will likewise rapidly fall from level $E_0$ to level $E_1$. On the other hand, because of the large time constant established by the large capacitor 96, the potential on input terminal 86 (circuit point C) will change considerably more slowly from the level $R \cdot E_0$ to the new level $R \cdot E$. This, of course, means that the potential on amplifier input terminal 86 will temporarily be more positive than the potential on input terminal 84 and as a consequence the output of amplifier 80 will go positive until the capacitor 96 discharges to where the potential on amplifier 86 is again less positive than the potential on input terminal 84. Thus, FIG. 4(b) represents that amplifier 80 will provide a positive output signal at circuit point D between times t1 and t2 which duration is primarily determined by the value of capacitor 96 and which is selected to be sufficiently long, e.g., 2 to 3 seconds, to assure that vehicles entering the monitored areas at very slow speeds will still be recognized. Once the output of amplifier 80 returns to a negative potential, the sensor unit of FIG. 4(a) is then again able to sense a further field intensity reduction as would be produced by the entry of a new vehicle into the monitored area. That is, it has been assumed that the vehilce 40 of FIG. 3 entered the monitored area 14W at time t1 illustrated in FIG. 4(b). This vehicle was detected by the amplifier 80 providing a positive output signal between times t1 and t2. Now assume that a second vehicle enters the area 14E of FIG. 3 at time t3 while the first vehicle still occupies the area 14W. The entry of the second vehicle will again cause a reduction of the potential level at circuit point A of FIG. 4(a) to again reduce the potential at circuit point B below the potential at circuit point C. As a consequence, the amplifier 80 will again provide a positive output signal between times t3 and t4. When one of the vehicles leaves the monitored area at time t5, it will produce an increase in potential at circuit point A from level $E_2$ to level $E_1$, but however, it should be understood that this increase in potential will not activate the amplifier 80. That is, the increased potential on circuit point A will merely make the potential on input terminal 84 even more positive than it was relative to the potential on input terminal 86 and as a consequence the amplifier 80 will not respond.

Prior to considering the manner in which the output of amplifier 80 is utilized to supply a command signal to actuate an audible signal, i.e., the bell unit 24 in the service station house 10 (FIG. 1) it is pointed out that a regeneration path 100 can optionally be utilized to speed and make more positive the response of amplifier 80 to an arriving vehicle. More particularly, the output of amplifier 80 is coupled through a feedback resistor 102 to the magnetometer secondary windings 58 and 60 in a manner to further reduce the magnetic field along the saturable core 52. That is, as has been pointed out, the entry of a vehicle into the monitored area causes a reduction in the external magnetic field intensity along core 52 so as to cause the amplifier 80 to produce a positive output signal. The regeneration path 100 couples the output of the amplifier 80 back to the magnetometer output windings 58 and 60 with a sense such that a positive amplifier output produces a current through the output windings in a direction to produce a field component in core 52 opposite to the ambient magnetic field 66 to thereby further reduce the net magnetic field intensity along core 52 and thus increase the effect of an entering vehicle.

In accordance with a significant feature of the present invention for application in service stations and the like, the output signal provided by amplifier 80 is coupled back to the bell unit in the house 10 (FIG. 1) through a 110 volt power line which normally exists in most modern service stations. More particularly, the output of amplifier 80 is connected to the enable input terminal 104 of a gate 106. Additionally, the output of oscillator 62 is connected to the input terminal 108 of gate 106. The gate 106 functions to pass the signal applied to its input terminal 108 to its output terminal 110 when an enabling signal (herein assumed to be positive) is provided on its input terminal 104. The gate 106 can take many forms but most simply, it can constitute an operational amplifier, similar to the amplifier 80, which will pass the signal applied to input terminal 108 only when a positive potential is applied to the enable input terminal 104. FIG. 4(b) illustrates the signal supplied by gate 106 at its output terminal 110 (Circuit point E) in response to the operation of the amplifier 80.

The output terminal 110 of gate 106 is coupled to the 110 volt power line which, as has been pointed out, normally extends to the service island in modern service stations. More particularly, the gate output terminal 110 is connected to the input of a high pass filter 112 whose output terminals 114 are connected to the 110 volt power line. Thus, as should now be readily appreciated, the entry of a permeable mass such as a vehicle into a monitored area such as either area 14E or 14W of FIGS. 2 and 3, causes amplifier 80 of FIG. 4(a) to produce a positive output signal to consequently couple a burst of the output signal of oscillator 62 to the 110 volt power line and thus to the bell unit 24 within the house 10.

Prior to terminating the discussion of FIG. 4(a), it is pointed out that a conventional power supply unit 120 is incorporated in the vehicle sensor unit to provide the required potential levels to oscillator 62, amplifier 80, gate 106, etc.

Figure 5:
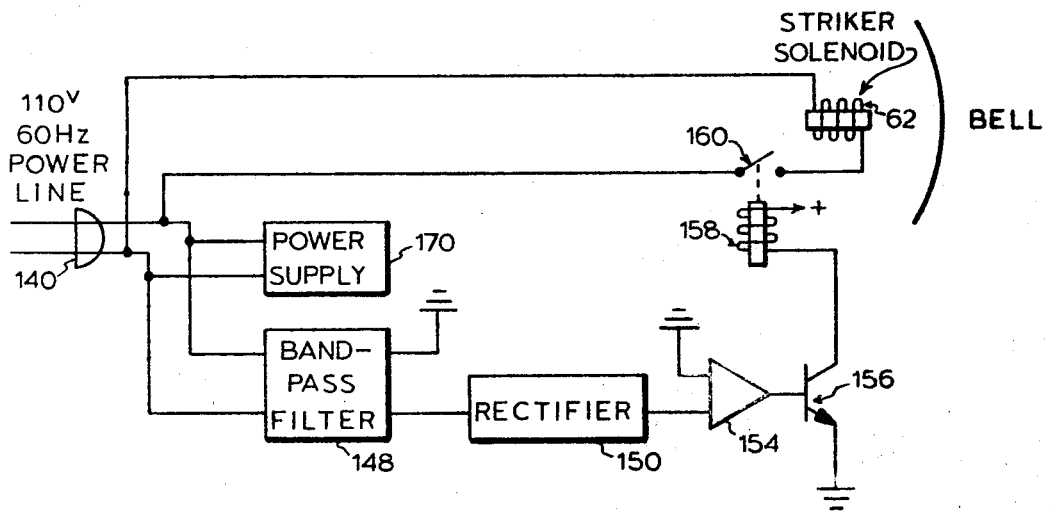
FIG. 5 is a schematic diagram of a bell unit in accordance with the present invention.

Attention is now called to FIG. 5 which schematically illustrates the circuitry of the bell unit 24 mounted within the service station house 10 (FIG. 1). It will be recognized that the function of the bell unit 24 is to monitor the 110 volt power line and respond to each high frequency burst thereon to energize the striker solenoid of a bell in order to audibly alert service station attendants.

The bell unit 24 of FIG. 5 is coupled to the 110 volt power line, as by plug 140. The plug 140 couples the power line to the input of a bandpass filter 148 which, of course, is selected to have a bandpass characteristic to pass signals within a small frequency band about a center frequency equal to the frequency of the output signal of oscillator 62. The output of the bandpass filter is coupled through rectifier 150 to power amplifier 154.

Although not illustrated, an appropriate noise discrimination circuit can be incorporated between filter 148 and amplifier 154 in order to distinguish the relatively long high frequency burst applied to the power line by the sensor unit from noise bursts which may spuriously appear on the power line in certain rare environments. In one simple form such a noise discrimination circuit could merely comprise a delay circuit selected so that it will suppress bursts supplied thereto which have a duration shorter than one-half second for example. It will be recalled that the burst supplied by the sensor unit will normally have a 2 to 3 second duration. Thus, the extent that any spurious 100 K hz signals appear on the power line, they will be suppressed unless they have a duration in excess of one-half second. Although the use of a simple delay circuit of this type is normally desirable and adequate in most environments to suppress spurrious noise, it is recognized that in other environments where, for some reason longer duration spurious signals are likely to be frequently encountered, other and well known more complex and effective noise suppression and/or information coding circuits can be utilized.

In any event, it should be appreciated that noise suppression circuitry appropriate to a particular environment can be readily selected to distinguish the high frequency bursts supplied to the power line from gate 110 in order to activate power amplifier 154. The output of power amplifier 154 controls a switch 156, illustrated as an NPN transistor. More particularly, the output of amplifier 154 is connected to the base of transistor 156. The emitter of transistor 156 is connected to ground. The collector of transistor 156 is coupled through a coil of relay 158 to a source of positive potential. The relay coil 158 controls a normally open switch contact 160 which is connected in series with the coil of a striker solenoid 162. The coil of the striker solenoid 162 is connected across the 110 volt power line and in series with the normally open switch contact 160. Energization of the striker solenoid coil causes a striker (not shown) to strike a bell sounder 164 in order to generate the audible alert for the station attendant.

FIG. 5 also illustrates a power supply unit 170 powered from the 110 volt power line. The power supply unit 170 is utilized in order to generate the appropriate potential levels to power the amplifier 154, for example.

From the foregoing, it should now be appreciated that a vehicle detection system has been disclosed herein for responding to the entry of a permeable mass, such as a vehicle, into a specified area of the earth's surface. It will be recognized that the sensor unit of FIG. 4(a) has the capability of responding to the entry of successive vehicles as a consequence of the use of the adaptive threshold circuit 82 which effectively develops a threshold signal which adapts to any condition which exists for a certain length of time. It is as a consequence of the adaptive feature of FIG. 4(a) that the sensor unit is able to respond to a new vehicle arriving in the area 14E (FIG. 3), for example, even through the area 14W is still occupied by a vehicle to which the sensor unit has previously responded.

Although the utility of the adaptive feature of the sensor unit of FIG. 4(a) for many applications should be readily apparent, in other applications, it may be desirable to not only sense the entry of a vehicle into a monitored area, but in addition, to sense the continued presence of the vehicle in that area. In order to do this, a threshold level related to ambient field intensity is held substantially constant for long durations rather than adapting to relatively rapidly changing conditions such as is caused by a arriving vehicle. More particularly, in order to detect presence, the threshold is held constant at a level determined by the ambient conditions at the particular site at which a sensor unit is being employed.

Figure 6A:
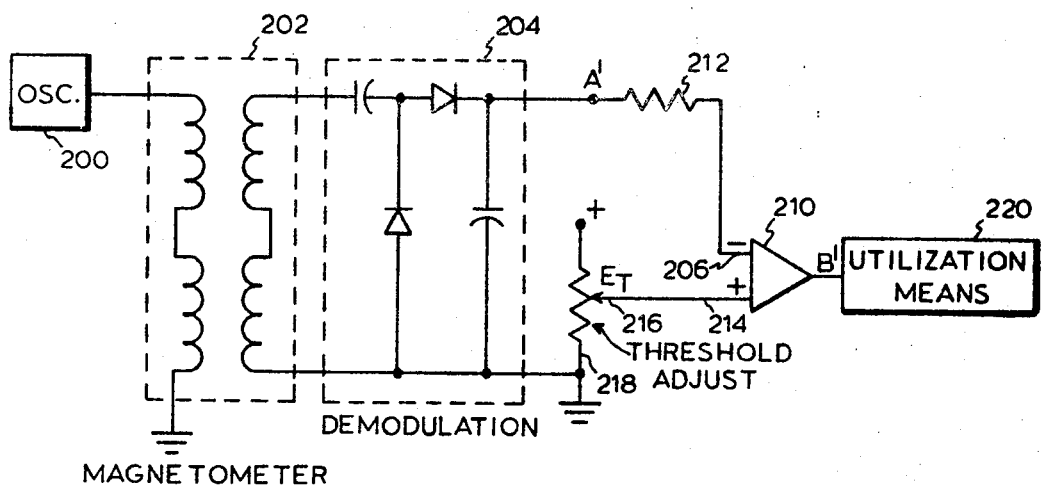
FIG. 6(a) is a schematic diagram of a sensor unit embodiment for detecting the presence of a vehicle within a specified area.
Figure 6B:
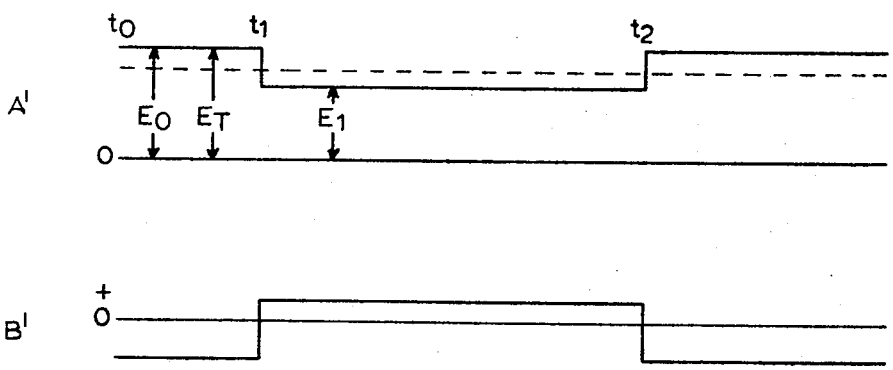
FIG. 6(b) is a diagram illustrating waveforms occurring at various points within the circuit of FIG. 6(a)

FIG. 6(a) illustrates a vehicle sensor unit which not only responds to the entry of a vehicle into a monitored area, but in addition to its continued presence in the area. It will be recognized that from FIG. 6(a), the circuit therein is quite similar to the circuit of FIG. 4(a). That is, it employs a high frequency oscillator 200 for energizing a magnetometer 202. The output of the magnetometer is then applied through a demodulation circuit 204 to develop a direct current potential at circuit point A', the level of which is substantially proportional to the magnetic field intensity seen by the magnetometer 202. FIG. 6(b) illustrates the potential level at point A'. The time interval between time $t0$ and $t1$ assumes that the magnetometer 202 sees the ambient magnetic field in the absence of a vehicle and as a consequence of that field produces a potential level $E_0$ at circuit point A'. As shown in FIG. 6(a), circuit point A' is coupled to the input terminal 206 of an amplifier 210 through a resistor 212. The second input terminal 214 of amplifier 210 is coupled to the slider 216 of a potentiometer 218. The potentiometer 218 is connected between a source of positive potential and ground. The output of the amplifier 210 is illustrated as being connected to a utilization means 220 which can, for example, constitute the gate 106 of FIG. 4(a). Although the regeneration path 100 of FIG. 4(a) is not illustrated in FIG. 6(a), it will be recognized that regeneration can advantageously be incorporated therein also.

In order to use the sensor unit of FIG. 6(a), the position of the slider 216 on potentiometer 218 must first be established to produce the threshold level. To do this, under ambient conditions, in the absence of a vehicle within the monitored area, the slider 216 is manually adjusted to a level just below that which trips the utilization means 220. That is, the slider 216 is moved along the potentiometer to establish a threshold potential $E_t$ thereon which is very slightly more negative than the potential on input terminal 206 under ambient conditions in the absence of a vehicle. This can be physically done by increasing in the positive direction the value of $E_t$ until the utilization means 220 is tripped and then backing off slightly so that the potential $E_t$ is established at a level just slightly below the potential $E_0$ established by the ambient magnetic field in the absence of a vehicle within the monitored area. This type of procedure is often referred to as a site adjustment and is normally performed only upon the initial installation of the sensor unit. Once the proper site adjustment has been found, the position of the slider 216 on the potentiometer 218 should be held fixed.

Whenever a vehicle arrives then into the area monitored by the magnetometer 202, the potential at circuit point A' will fall from the level $E_0$ to a level $E_1$ below the established threshold level $E_t$. As a consequence, the potential on amplifier input terminal 14 will become more positive than the potential on amplifier input terminal 206 and as a consequence the amplifier 210 will provide a positive output signal as shown in FIG. 6(b), to thus actuate the utilization means 220.

From the foregoing, it will be recognized that an adaptive vehicle sensor unit has been shown herein in FIG. 4(a) to sense the entry of a vehicle into a specified area and to thereafter adapt to the presence of the recognized vehicle in order to enable it to sense the entry of a subsequent vehicle into the monitored area. On the other hand, the sensor unit of FIG. 6(a) is able to respond to the entry and continued presence of a vehicle within the monitored area. It should readily be recognized that in actuality the capabilities of the sensor unit of FIG. 4(a) and FIG. 6(a) could be combined within a single unit in order to enable it to selectively operate in either an adaptive mode analogous to the operation of the sensor unit of FIG. 4(a) or a presence mode analogous to the operation of the embodiment of FIG. 6(a). Mode selection can, for example, be determined by the position of a manual switch on the sensor unit. It should further be recognized that either the sensor unit of FIG. 4(a) or 6(a) could be utilized to actuate a remote signal unit, such as the audible bell unit 24, as by coupling a high frequency signal through an existing power line. Although this manner of communication is particularly useful in service station applications, it should be recognized that other applications of the invention may not require remote communication. For example only, embodiments of the present invention can be utilized to signal the arrival of a vehicle adjacent a bank drive-in window. In this application, it is probable that the audible signal unit could be coupled directly to the sensor unit so that communication over the power line is not required. In other situations, as for example in conjunction with parking gates where the arrival of a vehicle adjacent a ticket dispensing machine is intended to raise a gate in front of the vehicle, a special communication conductor, might be utilized in lieu of the power line communication technique explained in conjunction with FIGS. 1–5.

Figure 7:
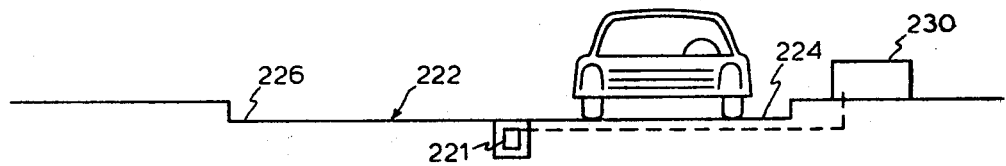
FIG. 7 is a diagram illustrating an alternate application of the present invention.

Although the embodiments of FIGS. 4(a) and 6(a) contemplate that the magnetic field intensity sensing device, i.e., the magnetometer, be contained within a housing also containing the illustrated electronics, it should further be recognized that the magnetometer along could be utilized remote from the circuitry utilized therewith. Thus, FIG. 7 illustrates an embodiment of the invention in which a probe 221 containing a magnetometer is buried beneath the surface of a roadway 222. FIG. 7 illustrates the probe 221 as being buried between two adjacent lanes 224 and 226, rather than within the lane as is characteristic of the prior art. That is, the probe 221 of FIG. 7 should be buried substantially vertically adjacent to but outside of the substantially vertical projection of the lane or area being monitored in order to sense a reduction in field intensity caused by a magnetically permeable mass. Utilization of the probe 221 in the manner shown in FIG. 7 enables a single probe to monitor both lanes 224 and 226.

The circuitry required to function with the probe 221 can be contained within a roadside housing 230 and can be connected thereto by a cable 232 buried within the roadway. Thus, for example, the housing 230 can contain the oscillator 200, the demodulation circuit 204, the amplifier 210 and accompanying circuitry, and the utilization means 220 of FIG. 6(a).

Figure 8:
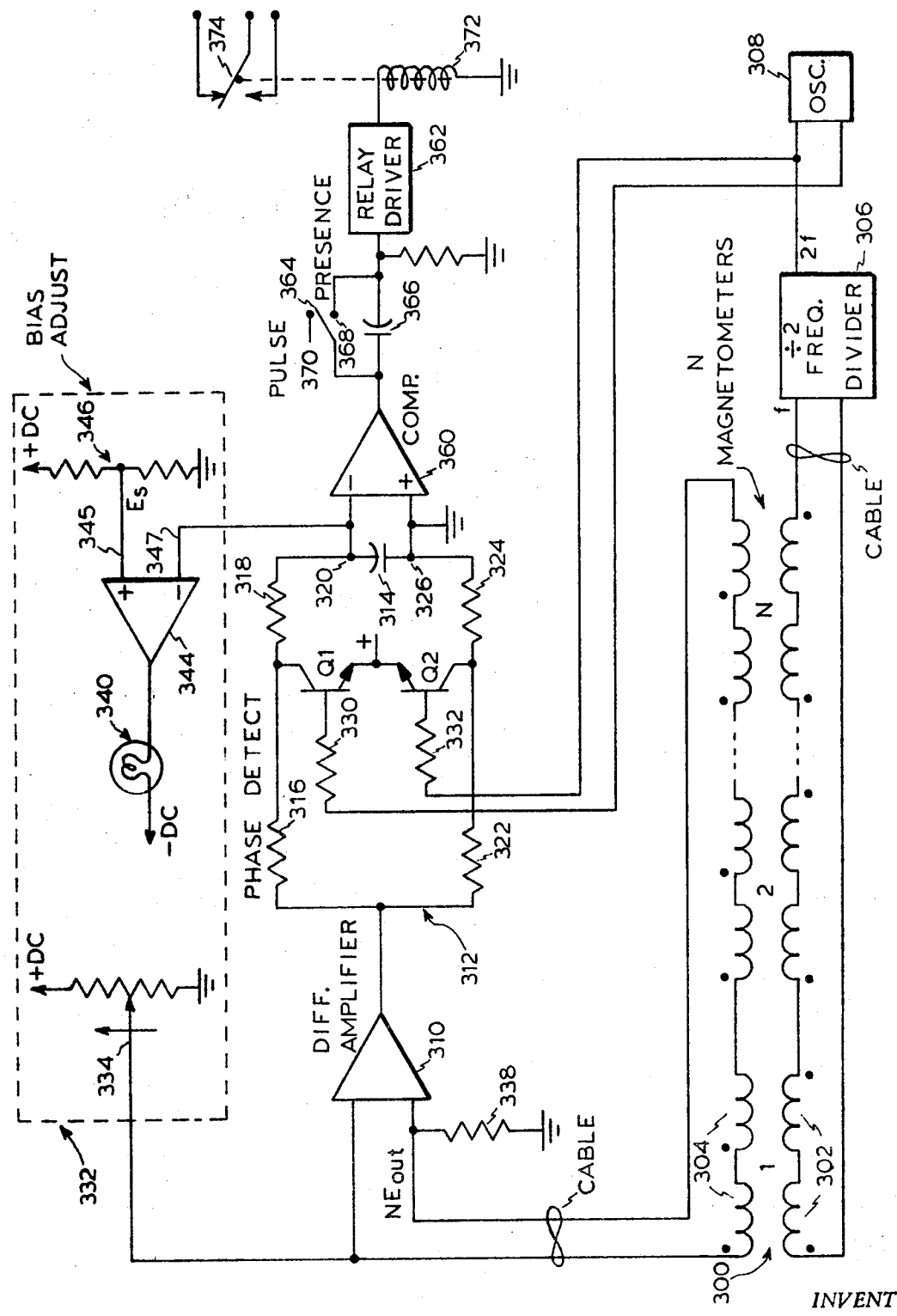
FIG. 8 is a schematic diagram of an excitation and detection circuit suitable for use with a plurality of magnetometer probes for providing pulse and presence indications.

Alternatively however, the application of FIG. 7 can employ the circuit configuration of FIG. 8 which is particularly well suited to situations where a plurality of probes are to be placed at locations having no readily available source of power so that it is necessary to supply magnetometer excitation current, as by cable 232. Such a situation is encountered, for example, in monitoring traffic on a multiple lane roadway. In a typical application of the present invention (see FIG. 13), N+1 traffic lanes in one direction can be monitored with N probes, each buried between lanes and connected to a common control circuit as represented in FIG. 8.

More particularly, from what has been said herein, it will be recalled that each magnetometer probe 300 (FIG. 8) includes a pair of primary or input windings 302 and a pair of secondary or output windings 304. In accordance with the preferred circuit arrangement of FIG. 8, the primary windings 302 of the N magnetometers are connected in series. Similarly, the secondary windings 304 of the N magnetometers are also connected in series.

The series connected primary windings 302 are connected across the output of a divide by 2 frequency divider 306 providing an excitation signal at frequency $f$. The frequency divider 306 is in turn driven by an oscillator 308 providing a signal at frequency $2f$. As has been mentioned, each magnetometer provides an output signal on its secondary windings 304 having a frequency equal to twice the frequency of the excitation signal applied to the primary windings thereof. As is well known in the art, the phase of this second harmonic output signal will either be in phase (i.e., $\phi = 0°$) or out of phase (i.e., $\phi = 180°$) with a corresponding frequency reference signal depending upon the direction of the magnetic field sensed by the magnetometer.

More particularly, attention is now diverted to FIG. 9(a) which depicts the V shaped characteristic of a typical flux gate magnetometer which is described in "Non-linear Magnetic Control Devices" by William A. Geyger, McGraw-Hill, Inc., Page 343. The characteristic depicted in FIG. 9(a) shows that the magnetometer produces an output voltage $E_{out}$ as a function of the magnitude of the sensed field intensity H. It will be noted that the characteristic is substantially symmetric and that as the field intensity is increased from zero in either direction, the magnetometer output voltage increases symmetrically and substantially linearly. As previously noted, the magnetometer output signal $E_{out}$ is an AC signal whose phase is dependent upon the direction of the sensed magnetic field intensity. It will be assumed herein that the signal $E_{out}$ is in phase with a second harmonic reference signal if the net field is in the same direction as the earth's field (which will hence forth be assumed to be positive) but is 180° out of phase with that reference signal if the net field intensity is in an opposite direction (henceforth assumed to be negative). As will be seen, the circuit arrangement of FIG. 8 detects the presence of a vehicle by comparing the phase of the magnetometer output signal with the phase of the second harmonic reference signal provided by the oscillator 308.

More particularly, the series connected output windings 304 are connected across the input of a differential amplifier 310. The output of the amplifier 310 is connected to the input of a phase detection circuit 312. The phase detection circuit 312 essentially consists of first and second transistor switches Q1 and Q2 which are alternately enabled by the second harmonic reference signal provided by the oscillator 308 as is shown in lines (c) and (d) of FIG. 10. The switches Q1 and Q2 control the charging of a capacitor 314 such that if the magnetometer output voltage is in phase, a positive voltage will be developed across the capacitor terminals 320 to 326. On the other hand if, the magnetometer output voltage is out of phase, then a negative voltage will be developed across the capacitor terminals, 320 to 326.

Note that the phase detection circuit 312 includes a path comprised of series resistors 316 and 318 connecting the output of differential amplifier 310 to the capacitor first terminal 320. A second path comprised of series resistors 322 and 324 connect the output of amplifier 310 to the capacitor second terminal 326. The emitters of transistor switches Q1 and Q2 are connected in common to a source of DC voltage. The collector of transistor Q1 is connected to the junction between resistors 316 and 318 and the collector of transistor Q2 is connected to the junction between resistors 322 and 324. The bases of transistors Q1 and Q2 are respectively connected through resistors 330 and 332 to complimentary output terminals of the oscillator 308 so as to be alternately switched, as represented in lines (c) and (d) of FIG. 10. When the transistor switch Q2 conducts ("on"), the output of amplifier 310 is steered through the path comprised of resistors 316 and 318 to capacitor terminal 320. If the output of amplifier 310 is in phase (line (e), FIG. 10), the capacitor 314 will be charged positive from terminal 320 to 326. If the output of amplifier 310 is out of phase (line (f) FIG. 10), then the capacitor 314 will be charged negative, i.e., from terminal 320 to 326.

Inasmuch as it is desired that the circuit of FIG. 8 be capable of indicating continuous presence of a vehicle, rather than mere entry, it is necessary to include bias means 332 for adjusting the detector to a particular site. That is, again calling attention to FIG. 9 (a), the point $H_v$ represents a typical value of vertical component of the earth's magnetic field intensity. For reasons having to do with stability and linearity, it is normally desirable that the magnetometer be operated at a point close to the axis of symmetry of the V-shaped characteristic. This can be accomplished by producing a bias field along the magnetometer axis in a direction opposite to the earth's field. In accordance with the present invention, the N magnetometers in a series string are all biased by a series bias current driven through the magnetometer secondary windings to an operating point Ho, which is associated with an output voltage Eo as depicted on the composite magnetometer characteristic shown in FIG. 9 (b). As will be seen hereinafter, the bias current magnitude is selected so as to establish a fixed operating point Ho regardless of the number of probes connected in series. Thus, although the bias current magnitude will vary dependent on the number of probes (i.e., the value of N), the operating point Ho will be fixed and independent of the probe number. This means that probe sensitivity will not vary based on the number of probes employed. FIG. 9(c) illustrates the voltage (Ecap) developed across the capacitor 314 as a function of sensed field intensity. Note that the voltage Ecap is substantially linearly related to field intensity H over a wide region and that it is negative for negative field values and positive for positive field values.

As mentioned, in order to adjust the circuit of FIG. 8 to a particular site, a bias current is driven through the series connected magnetometer secondary windings 304. In order to do this, a first terminal of the series connected secondary windings is connected to a slide 334 of a potentiometer 336, connected between a source of positive DC voltage and ground. A second terminal of the series connected secondary windings is connected through resistor 338 to ground. As the slide 334 is moved along the potentiometer 336, the bias field developed by the bias current through the magnetometer secondary windings is, of course, varied to thereby enable the operating point on the V-shaped characteristic of FIG. 9(b) to be varied. In order to determine the proper position for the slide 334, an indicator lamp 340 is provided controlled by the output of an operational amplifier 344 operating as a comparator.

A voltage $E_s$ is applied to a first terminal 345 of the amplifier 344 by connecting it appropriately to a voltage divider 346 connected between a source of positive DC potential and ground. The second terminal 347 of amplifier 344 is connected to the capacitor terminal 320. The amplifier 344 will provide a negative output as long as the potential on terminal 345 is negative compared to the potential on terminal 347. When the potential on terminal 347 becomes more negative than the potential on terminal 345, the amplifier 344 output signal will go positive to energize lamp 340.

Site adjustment is accomplished by moving the slide 334 along the potentiometer 336 (to increase the bias current and reduce the magnetometer output voltage) until the indicator lamp 340 just goes on and then backing off on the slide slightly to allow the lamp to go off. More particularly, in order to better understand the site adjustment operation, initially assume that no bias current is provided from the slide 334 to the magnetometer secondary windings. In the absence of bias current, the operating point of the magnetometers will be defined by the vertical component of the earth's magnetic field represented by $H_v$ in FIG. 9(b). The magnetometer output signal $NE_{out}$ will be in phase to thus produce a positive voltage across the capacitor from terminal 320 to 326. Thus, the potential on amplifier input terminal 347 will be greater than the potential on terminal 345 and the amplifier 344 will provide a negative output signal. Now, assume that the slide 344 is moved along the potentiometer 346 so as to produce a bias field along the magnetometer axes in a direction opposite to the earth's magnetic field. This will bias the magnetometers down toward the axis of symmetry of the V-shaped characteristic of FIG. 9(b) and reduce the voltage across the capacitor 314. As the net field seen by the magnetometers approaches null, the voltage on terminal 320 decreases below $E_s$ and the amplifier 344 output signal will become positive to energize lamp 340. By then slightly backing off on the slider 334 to extinguish the lamp, a bias current will have been established through the magnetometer secondary windings to establish the operating point Ho as represented in FIGS. 9(b) and 9(c).

With the operating point Ho established as represented in FIGS. 9(b) and 9(c), the circuit of FIG. 8 is then operable to detect vehicles which produce a reduction in magnetic field intensity as seen by the magnetometers such as to cross the axis of symmetry of the composite V-shaped characteristic. That is, in the absence of a vehicle adjacent to the magnetometers 300, operation at the operating point Ho will produce a positive voltage across capacitor 314. However, in the presence of a vehicle which reduces the magnetic field intensity so as to cross the axis of symmetry on the composite V-shaped characteristic, the phase of the magnetometer output signal $NE_{out}$ will shift by 180° thereby charging the capacitor 314 in an opposite direction. When the voltage across terminals 320 and 326 becomes negative, the output of amplifier 360 becomes positive.

The output of amplifier 360 is selectively coupled to relay driver 362 either directly through switch 364 or through a capacitor 366. That is, the switch 364 comprises a mode switch which can be selectively set to define either a pulse mode or presence mode. When the blade of switch 362 engages contact 368, the output of amplifier 360 is coupled directly to the relay driver 364 and for so long as the output of amplifier 360 is positive, the relay driver will be energized. The output of amplifier 360 will, of course, remain positive for so long as the field intensity seen by the magnetometers has a value to the left of the axis of symmetry as represented in FIG. 9(b). Thus, when the blade of switch 362 engages contact 368, the circuit of FIG. 8 functions to provide a continuous presence indication. On the other hand, when the blade of switch 362 engages contact 370, only transitions in the output of amplifier 360 are coupled to the relay driver 364. The output of relay driver 364 is connected to a solenoid coil 372 which in turn controls the positioning of relay contact 374 to operate any suitable utilization device.

Figure 11:
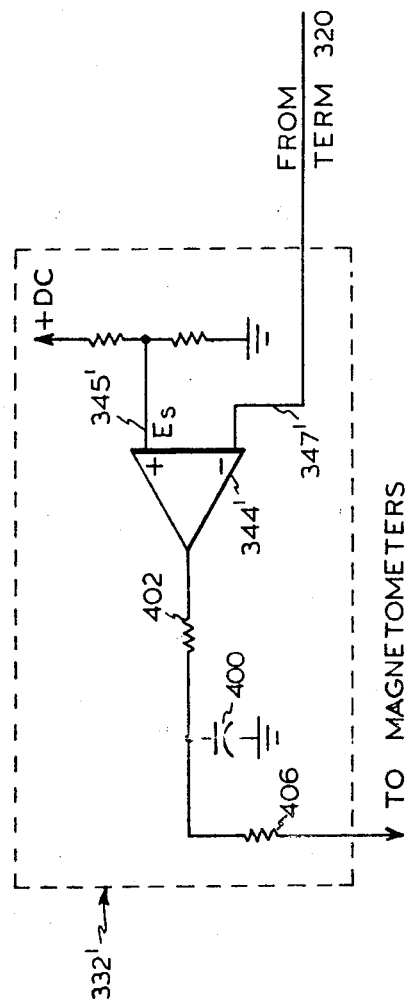
FIG. 11 is a schematic diagram of an alternative bias means for use in the circuits of FIG. 8 for adapting the magnetometer operating point to the existing field intensity.

Attention is now called to FIG. 11 which depicts an alternative circuit configuration, similar to that shown in FIG. 8, but substituting bias means 332' for previously mentioned bias means 332, to enable the magnetometer operating point to automatically adapt to a new field value. That is, whereas the bias means 332 of FIG. 8 included a manually operable site adjustment control (potentiometer slide 334), the circuit configuration of FIG. 11 automatically adjusts the bias current to establish the desired operating point H$o$. In addition to the elimination of the manual site adjustment control, the circuit of FIG. 11 has a significant advantage as compared to the circuit of FIG. 8. This is that if a vehicle stops adjacent to one of the magnetometer probes so as to reduce the net magnetic field intensity on the composite characteristic of FIG. 9(b) to the left of the axis of symmetry, the circuit of FIG. 11 will after a short time delay adapt to the new field value and thus thereafter be able to sense the arrival of a new vehicle. The disadvantage of the circuit of FIG. 11, as compared to the circuit of FIG. 8, is that it is incapable of indicating continuous vehicle presence since its operating point will automatically adapt to a new external field value. That is, the circuit of FIG. 11 is capable of indicating presence for a limited time only. Although, it will be recognized from the foregoing comments that the capabilities of the circuits of FIG. 8 and 11 are somewhat mutually exclusive, it should be apparent that the operational characteristics of both circuits can be achieved in a single unit by the inclusion of appropriate switches.

In referring to FIG. 11, elements corresponding to elements already mentioned in FIG. 8, will be identified by primed numerals corresponding to the numerals used in FIG. 8. Aside from the different circuitry for supplying bias current, the circuit of FIG. 11 can be substantially identical to the circuit of FIG. 8. In the circuit of FIG. 11, instead of connecting the output of amplifier 344' to an indicator lamp, it is connected to a delay circuit comprised of capacitor 400 and resistor 402 and then to a resistor 406 connected to the first terminal of the string of magnetometer secondary windings.

In the operation of the circuit of FIG. 11, the amplifier 344' will be responsive to the voltage developed across the capacitor 314' to supply bias current to the magnetometers through resistor 406 in order to reduce the potential across the capacitor to the value $E_s$. By way of explanation, assume initially that the external field is represented by $H_v$ as shown in FIG. 9(b). As has been previously indicated, this will produce a positive voltage across capacitor 314' in excess of the value $E_s$ applied to amplifier input terminal 345'. As a consequence, amplifier 344' will develop an output signal to supply current through resistor 406 in a first direction to the magnetometer secondary windings to produce a bias field opposite to the earth's magnetic field to establish the operating point H$o$. The development of this bias field will, of course, have the effect of reducing the positive potential across capacitor 314'. Upon the entry of a vehicle into the area being monitored, the sensed magnetic field will be reduced across the axis of symmetry of the V-shaped magnetometer characteristic, of FIG. 9(b). As a consequence, the potential across the capacitor 314' will become negative and thus cause the amplifier 344' to provide a bias current in the opposite direction to produce an oppositely directed magnetic field in the same direction as the earth's magnetic field. In this manner, the magnetometer operating point H$_0$ will be automatically adjusted to adapt to any new sensed field value. It should be recognized that this adaption can be accomplished rapidly or slowly merely dependent upon the value selected for the RC time delay circuit comprised of capacitor 400 and resistor 402. The optimum adaptation period depends upon the application in which the circuit is employed.

Although several applications of the embodiments of the invention and variations thereof have been mentioned herein, it should be readily recognized that embodiments of the invention will find utility in many other applications wherein it is desired to sense the entry or presence of a magnetically permeable mass within an area of the earth's magnetic surface.

Figure 12:
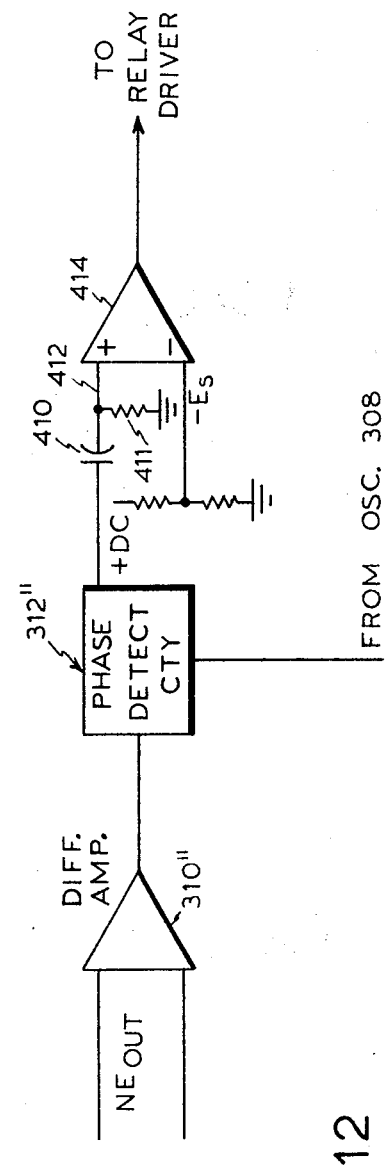
FIG. 12 is a schematic diagram of a further alternative circuit arrangement for use in the circuit of FIG. 8 for allowing the circuit to adapt to a new field intensity.

Attention is now called to FIG. 12 which illustrates an alternative manner of modifying the circuit of FIG. 8 to enable it to adapt to a new field intensity level. The circuit embodiment of FIG. 12, instead of using bias means for establishing a particular operating point, operates on the basis of looking for a voltage decrease out of the phase detection circuitry. That is, in order to modify the circuit of FIG. 8 in accordance with the teachings of FIG. 12, the bias means 332 are eliminated and the circuitry shown in FIG. 12 is substituted for the circuitry shown in FIG. 8 between the magnetometer secondary winding terminals and the relay driver. For convenience, elements in FIG. 12 corresponding to elements in FIG. 8 are designated by the same numbers, but double primed.

In the circuit of FIG. 12, the DC output voltage provided by phase detector circuit 312'' is coupled by capacitor 410 to a first input terminal 412 of an operational amplifier 414. As should be apparent, the capacitor 410 acts to AC couple the phase detector circuit output to the amplifier 414 so that the amplifier only sees transitions which occur in the phase detector output rather than the absolute level thereof. The magnitude and direction of the phase detector output transition is compared with a threshold potential $E_s$ applied to a second input terminal of amplifier 414. If the transition exceeds the threshold potential $E_s$ in a negative direction, then the amplifier 414 will provide an output signal to enable the relay driver. The operation of the circuit of FIG. 12 can be easily related to the characteristic depicted in FIG. 9(c). That is, the net magnetic field intensity can be at any point along the horizontal axis which will produce some steady DC voltage at the phase detector output. Upon the arrival of a vehicle adjacent to one of the magnetometers, this net field will be reduced by $\Delta H$ which in turn will produce a transition $\Delta E cap$ at the output of the phase detector. If $\Delta E cap$ is more negative than the threshold $- E_s$, the amplifier 414 will respond to energize the relay driver. In the absence of further transitions in the phase detector output signal, the amplifier 414 will remain enabled for a period determined by the time constant of capacitor 410 and resistor 411 which, of course, governs the rate at which the capacitor charges.

Figure 13:
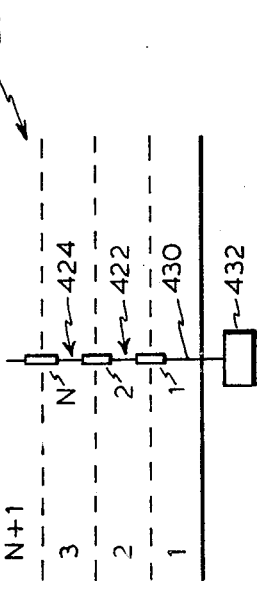
FIG. 13 is a schematic plan view of a system in accordance with the invention for monitoring vehicular traffic on a multilane roadway.
Figure 14:
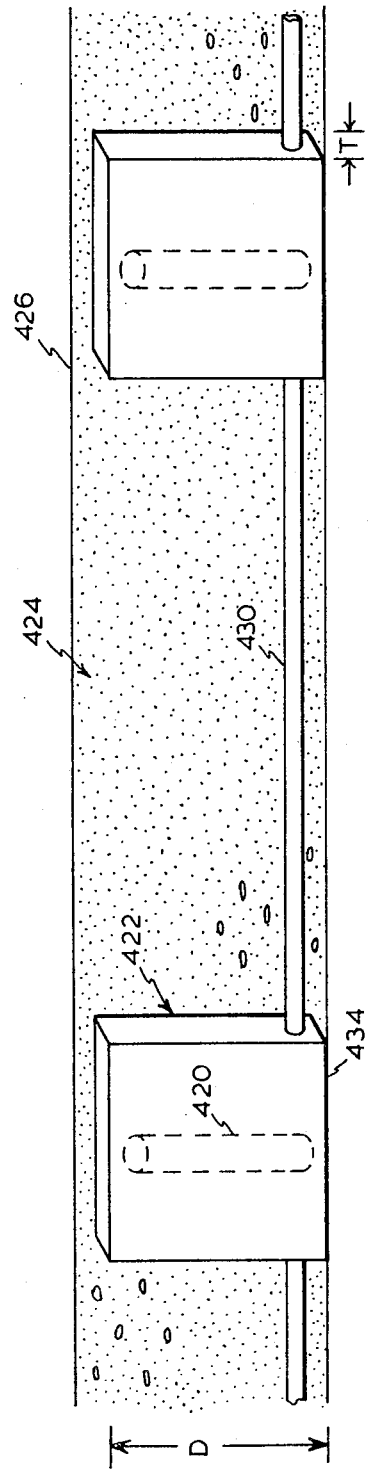
FIG. 14 is an isometric illustration of a preferred probe structure suitable for burial within a saw cut roadway slot, as represented in FIG. 13.

Attention is now called to FIG. 14 which illustrates a preferred probe structure particularly suited for use in multiple lane traffic applications of the type represented in FIG. 13. In order to install wires beneath the surface of a roadway, where conduits have not been provided, it is common practice to make a slot by using a concrete cutting saw. Typically, a ¼ inch wide slot can be easily cut to a depth of approximately 2 inches. In the application illustrated in FIG. 12, N probes can be used to monitor traffic in N+1 lanes by installing each probe adjacent the roadway surface coincident with the boundary line between adjacent lanes. In accordance with the preferred probe structure illustrated in FIG. 14, the magnetometer element 420, is sealed within a substantially rectangular housing 422. The housing 422 can for example, be molded of plastic around the magnetometer element 420 or alternatively could for example be formed of aluminum hollowed out to receive the magnetometer element and then sealed with some appropriate potting compound. Numerous other materials are suitable for forming the housing 422. Regardless of the material utilized, it is significant in accordance with the present invention to dimension the housing 422 so as to enable it to fit within a saw cut slot 424 formed within a roadway 426. Thus, the housing thickness T should preferably be slightly less than one quarter inch and the depth D should be less than 2 inches. Such dimensions are sufficient to accommodate magnetometer elements of the type discussed in the aforementioned U. S. Pat. No. 3,249,915. In order to facilitate easy placement of the magnetometer probe structures of FIG. 13 within the slot 424, a multiconductor cable 430, interconnecting the probe structures to each other and to the common control circuitry 432 (FIG. 12) enters the housing 422 through opposed edge surfaces close to the housing bottom edge 434 thereof.

What is claimed is:

1. A system for monitoring a specified volume within a magnetic field to determine whether the volume contains a magnetically permeable mass, said system comprising:

magnetometer means for measuring magnetic field intensity through a sampling area thereof and for providing an output signal indicative of the level and direction of said measured field intensity;

means supporting said magnetometer means adjacent to said volume with the sampling area thereof outside of the projection of said volume projected in the direction of said magnetic field;

means for providing a reference signal indicative of a threshold level of magnetic field intensity through said sampling area; and circuit means responsive to said output signal indicating a reduction in magnetic field intensity through said sampling area below said threshold level for indicating said specified volume contains a magnetically permeable mass, said circuit means including means for determining a change in direction of said magnetic field intensity through said sampling area.

2. The system of claim 1 including bias means for producing a magnetic bias field through said sampling area substantially equal in magnitude and opposite in direction to the field through said sampling area in the absence of a permeable mass in said volume.

3. The system of claim 2 wherein said magnetometer means comprises a flux gate magnetometer providing an AC output signal of frequency $2f$ and phase $\phi$, in response to a magnetic field intensity in a first direction through said sampling area and of frequency $2f$ and phase $(\phi_1+180°)$ in response to a magnetic field intensity in an opposite direction through said sampling area;

means providing a second reference signal of frequency $2f$ and phase $\phi_1$; and wherein said circuit means includes means for determining whether said AC output signal is in phase or out of phase with respect to said second reference signal.

4. The system of claim 1 wherein said volume is comprised of a plurality of separate subvolumes and wherein said magnetometer means comprises a plurality of flux gate magnetometers each responsive to the magnetic field intensity through a sampling area thereof for providing an output signal component indicative of the level and direction of that magnetic field intensity; and wherein said supporting means supports each of said plurality of magnetometers adjacent to a different one of said subvolumes with the sampling areas thereof outside of the projections of said subvolumes in the direction of said magnetic field.

5. The system of claim 4 wherein said circuit means is responsive to the sum of output signal components provided by said plurality of magnetometers.

6. The system of claim 5 including bias means for producing a magnetic bias field through said sampling areas of said plurality of magnetometers of a direction and magnitude to almost null the sum of said output signal components.

7. The system of claim 6 including means for manually varying said bias field.

8. The system of claim 6 including means responsive to the sum of said output signal components for automatically varying said bias field and including time delay means whereby variations in said bias field will log variations in said sum of output signal components.

9. The system of claim 6 wherein each of said output signal components constitutes an AC signal of frequency $2f$ and phase $\phi_1$ in response to a magnetic field intensity in a first direction through a sampling area and of frequency $2f$ and phase $(\phi_1+180°)$ in response to a magnetic field intensity in an opposite direction through the sampling area;

means providing a second reference signal of frequency $2f$ and phase $\phi_1$; and wherein said circuit means includes means for determining whether the sum of output signal components is in phase or out of phase with said second reference signal.

10. The system of claim 6 wherein said bias means includes a source of DC current of variable magnitude and direction; and wherein each of said flux gate magnetometers includes at least one winding;

means connecting at least one of said windings from each of said plurality of magnetometers in series; and means for driving said DC current through said series path of magnetometer windings.

11. The system of claim 4 wherein each of said flux gate magnetometers is disposed in a thin substantially solid housing suitable for insertion in a narrow slot adapted to be saw cut in a roadway.

12. The system of claim 11 wherein said housing includes first and second opposite edge surfaces; and first and second multiconductor cables extending through said first and second surfaces into said housing for connection to the magnetometer disposed therein.

13. A vehicle detection system having a common conductor extending between a service area and a remote area, for indicating at said remote area the entry of a vehicle into said service area, said system comprising:

a magnetometer means for providing an output signal indicative of the level of magnetic field intensity through a sampling area defined thereby;

means supporting said magnetometer means proximate to said service area with the sampling area of said magnetometer means being outside of the volume formed by projecting said service area in the direction of the magnetic field thereat; and circuit means responsive to said output signal indicating a reduction in field intensity level for indicating at said remote area the entry of a vehicle into said service area.

14. The system of claim 13 wherein said magnetometer means comprises a flux gate magnetometer providing an AC output signal of frequency $2f$ and phase $\phi$, in response to a magnetic field intensity in a first direction through said sampling area and of frequency $2f$ and phase ($\phi_1+180°$) in response to a magnetic field intensity in an opposite direction through said sampling area;

means providing a second reference signal of frequency $2f$ and phase $\phi_1$; and wherein said circuit means includes means for determining whether said AC output signal is in phase or out of phase with respect to said second reference signal.

15. A system useful for monitoring vehicular traffic on a roadway surface including N+1 lanes, said system including:

N probes each adapted for installation adjacent to said roadway surface substantially coincident with a boundary line between adjacent lanes, each of said probes including a magnetic field sensing device therein providing an output signal component indicative of the level of magnetic field intensity through a sampling area thereof:

means providing a reference signal representative of a threshold level of magnetic field intensity; and circuit means responsive to said reference signal and said output signal components for indicating when the level of magnetic field intensity sensed by one of said field sensing devices is reduced below said threshold level.

16. The system of claim 15 wherein each of said probes includes a thin substantially solid housing adapted for insertion into a slot, saw cut in the roadway surface across said N+1 lanes; and a multiconductor cable, adapted to be received in said slot, interconnecting said probes to one another and to said circuit means.

17. The system of claim 16 including bias means for producing a magnetic bias field through said the sampling areas of said sensing devices substantially equal in magnitude and opposite in direction to the fields through said sampling areas in the absence of vehicular traffic on said roadway proximate to said probes.

18. The system of claim 17 wherein said magnetic field sensing devices each comprises a flux gate magnetometer providing an output signal component constituting an AC signal of frequency $2f$ and phase $\phi_1$ in response to a magnetic field intensity in a first direction through a sampling area and of frequency $2f$ and phase ($\phi_1+180°$) in response to a magnetic field intensity in an opposite direction through the sampling area;

means providing a second reference signal of frequency $2f$ and phase $\phi_1$; and wherein said circuit means includes means for determining whether the sum of output signal components is in phase or out of phase with said second reference signal.

* * * * *